United States Patent
Donatantonio et al.

(10) Patent No.: US 11,273,827 B2
(45) Date of Patent: Mar. 15, 2022

(54) METHOD AND SYSTEM FOR OBTAINING REFERENCE SIGNALS FOR VEHICLES CONTROL SYSTEMS AND CORRESPONDING CONTROL SYSTEM

(71) Applicant: UNIVERSITÀ DEGLI STUDI DI SALERNO, Fisciano (IT)

(72) Inventors: Fabrizio Donatantonio, Fisciano (IT); Flavio Giannetti, Fisciano (IT); Cesare Pianese, Fisciano (IT); Ivan Arsie, Fisciano (IT)

(73) Assignee: UNIVERSIT A' DEGLI STUDI DI SALERNO, Fisciano (IT)

( * ) Notice: Subject to any disclaimer, the term of this patent is extended or adjusted under 35 U.S.C. 154(b) by 195 days.

(21) Appl. No.: 16/625,932

(22) PCT Filed: Jun. 28, 2018

(86) PCT No.: PCT/IB2018/054822
§ 371 (c)(1),
(2) Date: Dec. 23, 2019

(87) PCT Pub. No.: WO2019/003187
PCT Pub. Date: Jan. 3, 2019

(65) Prior Publication Data
US 2020/0156637 A1    May 21, 2020

(30) Foreign Application Priority Data

Jun. 30, 2017   (IT) .................. 102017000073748

(51) Int. Cl.
*B60W 30/14*    (2006.01)
*B60W 30/188*   (2012.01)
(Continued)

(52) U.S. Cl.
CPC ........ *B60W 30/143* (2013.01); *B60W 30/188* (2013.01); *B60W 40/105* (2013.01); *B60W 2040/1323* (2013.01)

(58) Field of Classification Search
CPC ............ B60W 30/143; B60W 30/188; B60W 40/105; B60W 2040/1323
See application file for complete search history.

(56) References Cited

U.S. PATENT DOCUMENTS

2010/0049400 A1*  2/2010  Duraiswamy ....... B60W 30/143
                                                    701/33.4
2017/0080931 A1*  3/2017  D'Amato ............. B60W 30/16
(Continued)

FOREIGN PATENT DOCUMENTS

EP          0 752 548        1/1997
WO     WO 2010/144029       12/2010
(Continued)

OTHER PUBLICATIONS

Brent, R. P., "Chapter 4: An Algorithm with Guaranteed Convergence for Finding a Zero of a Function," Algorithms for Minimization Without Derivatives, Englewood Cliffs, NJ: Prentice-Hall, ISBN 0-13-022335-2, 1973, pp. 47-61.
(Continued)

*Primary Examiner* — Peter D Nolan
*Assistant Examiner* — Wae L Louie
(74) *Attorney, Agent, or Firm* — Nixon & Vanderhye P.C.

(57) ABSTRACT

A method for obtaining reference signals for vehicle control systems, in function of a vehicle geographical position along a travel route, includes providing data relating to the vehicle and data relating to a route to travel, and determining a vehicle driving force reference signal and a vehicle speed reference signal through a first optimisation process configured to optimise the driving force along the travel route. An (Continued)

engaged gear reference signal, in function of the positions of the vehicle along the travel route, is determined through a second optimisation process configured to optimise fuel consumption of the vehicle along the travel route. The second optimisation process is subsequent to the first optimisation process, and the data relating to the travel route, as well as the driving force reference signal and the speed reference signal, is received as input, determined through the first optimisation process.

16 Claims, 8 Drawing Sheets

(51) Int. Cl.
*B60W 40/105* (2012.01)
*B60W 40/13* (2012.01)

(56) References Cited

U.S. PATENT DOCUMENTS

| 2019/0084564 | A1* | 3/2019 | Miura | B60W 30/12 |
| 2020/0156637 | A1* | 5/2020 | Donatantonio | B60W 10/10 |
| 2021/0063181 | A1* | 3/2021 | Saleh | G01C 21/3469 |

FOREIGN PATENT DOCUMENTS

| WO | WO 2010/144031 | 12/2010 |
| WO | WO 2012/088537 | 6/2012 |
| WO | WO 2013/095234 | 6/2013 |
| WO | WO 2014/149043 | 9/2014 |

OTHER PUBLICATIONS

International Search Report dated Nov. 14, 2018 issued in PCT International Patent Application No. PCT/IB2018/054822, 3 pp.

* cited by examiner

METHOD AND SYSTEM FOR OBTAINING REFERENCE SIGNALS FOR VEHICLES CONTROL SYSTEMS AND CORRESPONDING CONTROL SYSTEM

This application is the U.S. national phase of International Application No. PCT/IB2018/054822 filed Jun. 28, 2018 which designated the U.S. and claims priority to Italian Patent Application No. 102017000073748 filed Jun. 30, 2017, the entire contents of each of which are hereby incorporated by reference.

BACKGROUND

The present invention relates to a method and a system for obtaining reference signals for vehicles control systems.

The present invention also relates to a control system for vehicles wherein such a method and such a system for obtaining reference signals are advantageously applicable.

STATE OF THE ART

In the state of the art systems for controlling the cruising speed of vehicles, so-called "Cruise control" systems, are known which facilitate the driving, by allowing an automatic adjustment of a vehicle speed, compatible with its set-up conditions, with the aim of reducing the consumption thereof.

Such systems, which have become part of the standard equipment, for example in transport vehicles, in their more sophisticated version, in order to maintain a set cruising speed, in addition to acting on the gas control, can act on the vehicle braking devices (for example the retarder, the traditional friction brakes or the engine brake) as well as on the control of the gearbox, in the case of automatic transmission.

In some cases, traditional systems for determination and control of the cruising speed of a vehicle does not use information on the conditions of the route to travel, and therefore, in some contexts, they are found to be not optimal for speed adjustment.

Other prior art systems take, however, into account the characteristics of the route to travel, like for example the systems described in the documents WO 2012/088537, WO 2010/144029, WO 2010/144031 and WO 2013/095234.

Document WO 2012/088537 teaches a method for determining the recommended operative conditions of a vehicle, which minimize the fuel consumption, taking into consideration also the properties of the route to be travelled. The method disclosed in WO 2012/088537 comprises two steps: a first offline step, wherein a coarse evaluation of the pattern of the vehicle speed and gear state is performed, based on the route to be travelled, and a second on-line step, refining the pattern on the vehicle speed and gear state, based on the coarse evaluation of the pattern of the vehicle speed and gear state resulting from the first offline step. The first offline step and the second on-line step above optimize the same cost function.

The systems of other documents, which are focused on the determination of a reference speed of a vehicle, according to the assessment of the conditions of a road "horizon", are however very heavy from a computational point of view.

There is therefore the need to develop a method for obtaining reference signals for vehicles control systems, which is alternative and solves the above mentioned drawbacks of the conventional methods.

Goals of the Invention

The main object of the present invention is to improve the state of the art in the field of vehicles in general, and more particularly in the field of systems for controlling the speed of such vehicles.

More particularly, it is an object of the present invention to provide a method for obtaining reference signals for vehicles control systems that is alternative with respect to traditional methods.

Another object of the present invention is to provide a method for obtaining reference signals for control systems of a vehicle, which is fast to be implemented.

Yet another object of the present invention is to provide a method for obtaining reference signals for control systems of a vehicle, which requires more limited computational resources with respect to traditional methods, thereby ensuring high reliability and efficiency.

Another object of the present invention is to provide a system for obtaining reference signals for control systems of a vehicle, which is easy to implement at competitive costs.

Not the last object of the present invention is to provide a control system for vehicles which is alternative to traditional systems.

BRIEF DESCRIPTION OF THE DRAWINGS

The present invention will be now described, for illustrative but not limiting purposes, according to its preferred embodiments, with particular reference to the drawings in the accompanying Figures, wherein.

EMBODIMENTS OF THE INVENTION

Figure 1:
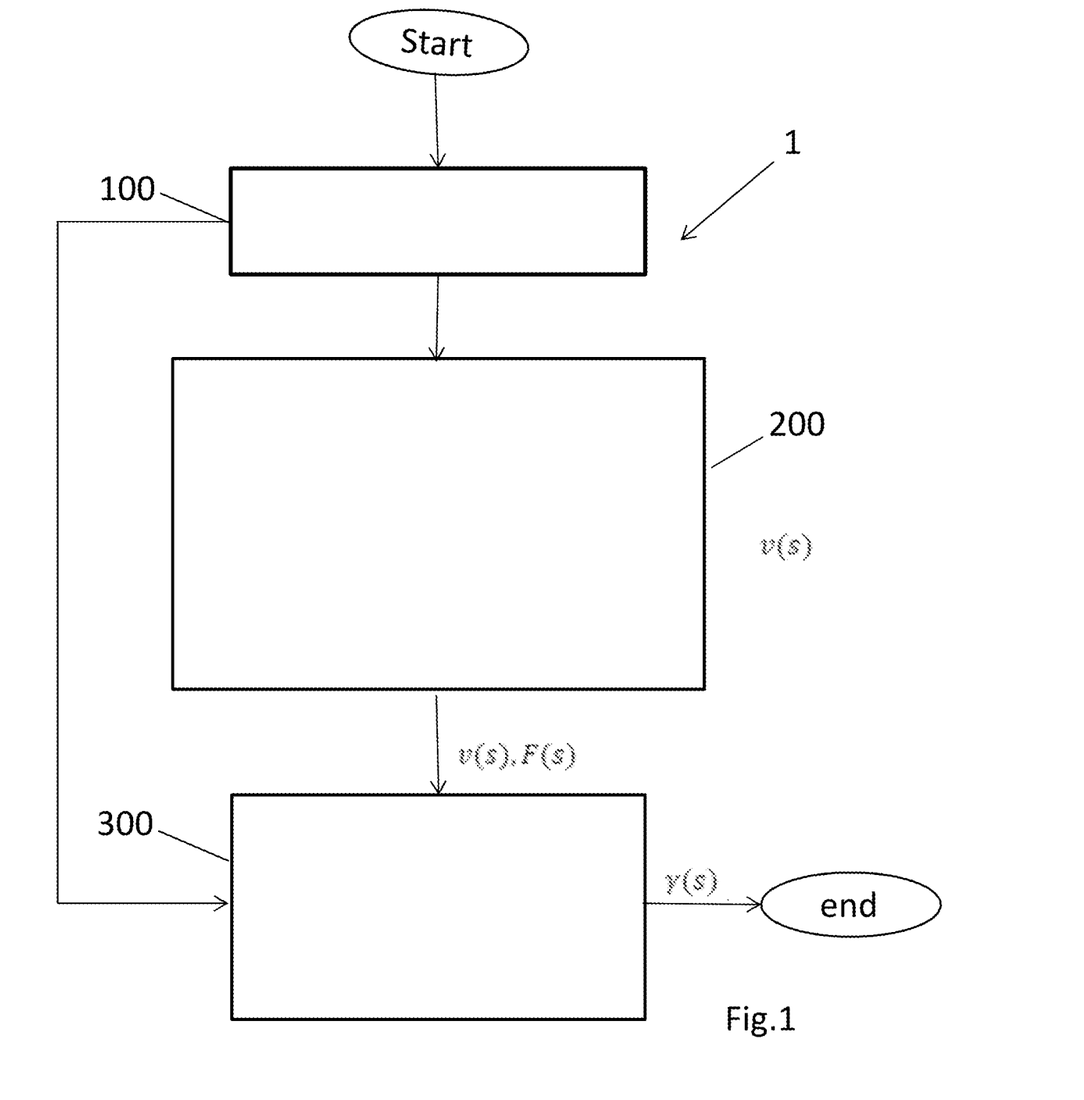
FIG. 1 shows a first flow diagram of the method according to the present invention.
Figure 2:
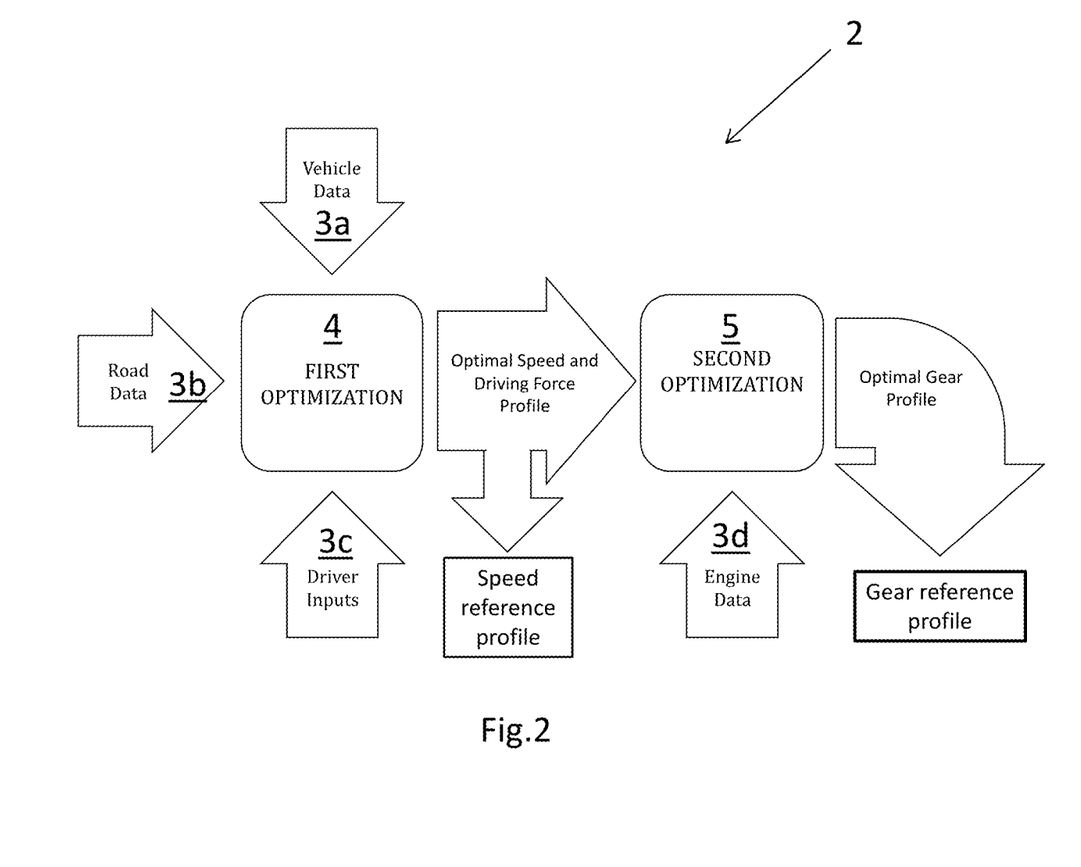
FIG. 2 is an example block diagram of a system configured to perform the method of FIG. 1.

With reference to the accompanying Figures, in particular at FIGS. 1 and 2 it will be noted that the method for obtaining reference signals for control systems of a vehicle according to the present invention is generally indicated with reference 1 and comprises at least the following operating steps of:

providing (100) at least data relating to said vehicle V and at least data relating to a route to travel (step 100);

Determine, on the basis of said data, at least one reference signal of the driving force F=F(s) and a reference signal of the speed v=v(s) for the vehicle V, in function of the position s of the vehicle itself, along the route to travel, through a first optimisation process (step 200) (for which the speed v=v(s) is generally not a constant cruising speed); and determine at least one reference signal of the engaged gear γ(s) (or of the corresponding gear changes $u_{sh}(s)$) of the vehicle V, in function of the position s of said vehicle along the route to travel. Through a second optimisation process (step 300).

The second optimisation process (step 300) is subsequent to the first optimisation process (step 200) and receives as input both the data relating to the vehicle V and the data relating to the route to travel, and the reference signal of the driving force F and the speed reference signal v, processed during the first optimisation process (step 200).

With particular reference to step 100 of the preferred embodiment of the method according to the present invention (see FIG. 3), it envisages to provide information relating to the vehicle, which may include: information relating to its mass, to its aerodynamic resistance and to the rolling friction (for example in the form of corresponding coefficients), to the pattern of the maximum torque developed by the engine of the vehicle and, as will be seen below, information relating to fuel flow maps (for example, as function of the torque developed by the engine, and the speed of the same engine) and the transmission ratios.

Figure 3:
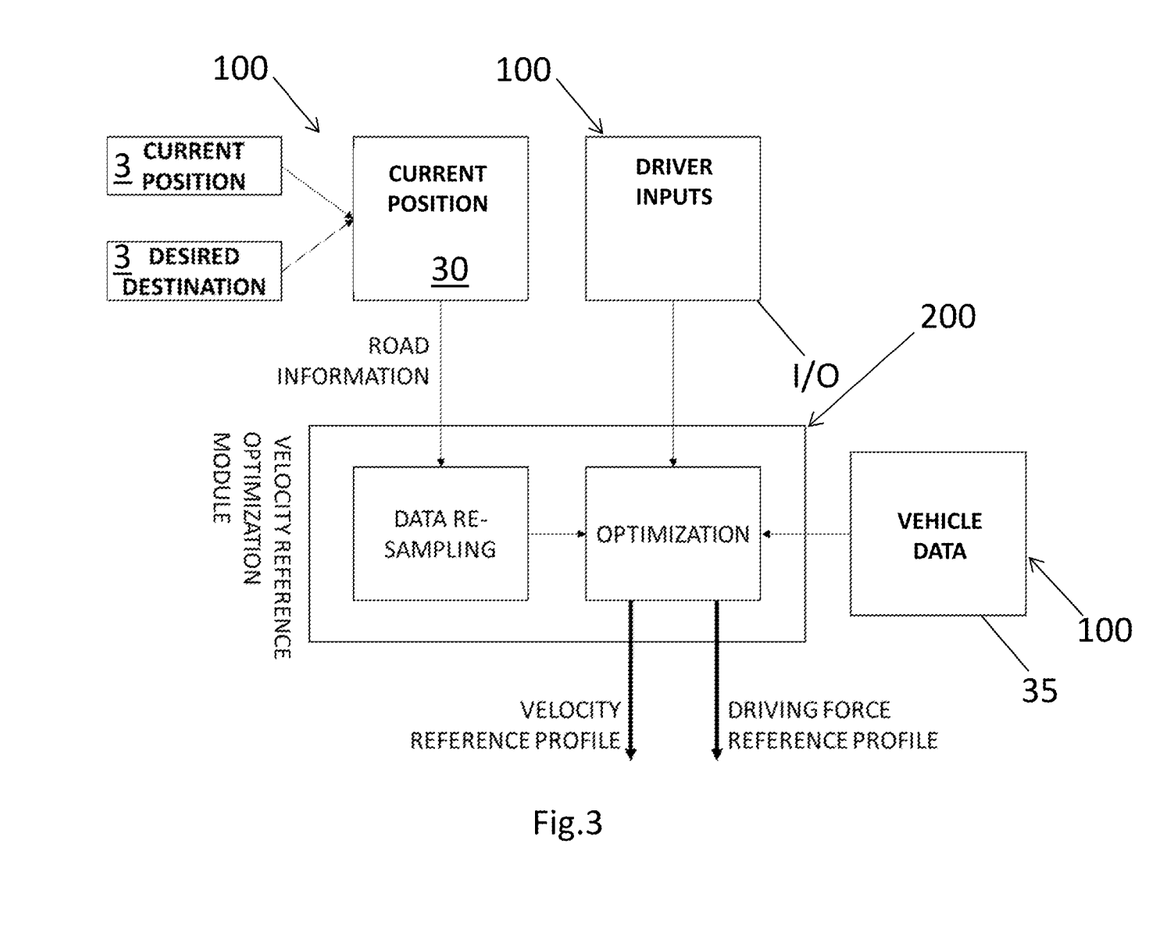
FIG. 3 shows an example block diagram of first optimisation process of the method of FIG. 1.

The step 100 of the method according to the present invention also provides for the supply of certain data relating to the route that the vehicle V will travel, including, for example:

a current geographical position of the vehicle, provided for example by means of a suitable Global Positioning System (GPS, GLONASS or other similar system), a destination geographical position, information relating to the route between the starting geographical position of the vehicle (which is advantageously the geographical position of departure of the route to travel) and the destination geographical position (including the path of the roadway of the route to travel), such as the slope or the altitude of the roadway that the vehicle must travel, data corresponding to the speed limits along the route, as well as a desired arrival time, inserted for example by the driver of the vehicle, and other optional data such as, for example, an average speed, the maximum and minimum speed desired by the driver as well as the degree of adherence to those speeds.

The information that can be inputted by the driver are used by the method according to the present invention, as will be seen hereinafter, to take into account also his driving style and the conditions of the road to travel.

These data are used to perform a first optimisation process (step 200), after suitable treatment (for example comprising a filtering step and re-sampling and/or other treatment of any suitable type), which provides for determining a reference signal of the vehicle speed v (indicated in FIG. 7 with reference V) that optimizes the fuel consumption during the route to travel, as well as a reference signal of the driving force F of the vehicle along that route.

More in particular, said first optimisation process comprises an analytical process of minimization of a first cost function which is a cost function J(F) of the driving force F, required to drive the vehicle V of mass m along a route having global length S.

The minimization of the cost function J(F) with respect to the drive force F is given by the relation:

$$\min_F \{J(F)\} = \min_F \left\{ \int_0^S F^2 ds \right\} \tag{1}$$

with the following state equation in the time domain:

$$m\frac{dv}{dt} = F - F_{grade} - F_{drag} - F_{roll} \tag{2}$$

and the constraints:

$$v_{min} \leq v \leq v_{max} \tag{3}$$

$$F \leq F_{max} \tag{4}$$

$$\int_0^S \frac{1}{v} ds \leq T_{max} = \frac{S}{\bar{v}_{des}} \tag{5}$$

wherein v is the vehicle speed, S is, as said above, the global length of the route to travel $v_{min}$ is the minimum speed and $v_{max}$ is the maximum speed of the vehicle (optionally provided by the driver and/or from the data relating to the route the vehicle V will travel, such as those relating the speed limits), $F_{max}$ is the available maximum driving force of the vehicle (where the maximum driving force $F_{max}$ is the control variable), $T_{max}$ is a desired maximum travel time (optionally provided by the driver) and $\bar{v}_{des}$ is the set desired average speed, even this optionally provided for by the driver of the vehicle V.

The minimization (1) of the cost function J(F) is aimed at minimising the energy used to drive the vehicle having mass m along a route of finite length S, given the constraints for the state equation (2) relating to the speed v, maximum driving force $F_{max}$ and desired maximum travel time $T_{max}$ mentioned above in equations (3) to (5). Moreover, the state equation (2) also takes into account the fact that the vehicle V is subject to the following exogenous forces:

$$F_{grade} = mg \sin(\alpha) \tag{6}$$

$$F_{drag} = \tfrac{1}{2}\rho_{air}C_xA\ v^2 \tag{7}$$

$$F_{roll} = mg \cos(\alpha)[C_{r0}+C_{r1}v^2] \tag{8}$$

Due to the slope of the road along which the vehicle is travelling ($F_{grade}$), to its aerodynamic resistance $F_{drag}$ and to the rolling friction $F_{roll}$, respectively, which depend, other than the global mass m of the vehicle V, also from the gravitational acceleration g, from the angle α corresponding to the slope of the road (which in general can be variable along the route, for which α=α(s)), from the ambient air density $\rho_{air}$ (which in general can be variable along the route, for example because the route runs through different altitudes for which $\rho_{air}=\rho_{air}(s)$), from the aerodynamic drag coefficient $C_x$, from the frontal area A of the vehicle V, from the first coefficient $C_{r0}$ of rolling resistance (which in general can be variable along the route, for example due to the progressive wear of the tires and/or the different type of asphalt or soil and/or the potentially different weather conditions, for which $C_{r0}=C_{r0}(s)$) and from the second coefficient $C_{r1}$ of rolling resistance (which in general can be variable along the route, for example as a result of the progressive wear of the tires and/or the different type of asphalt or soil and/or the potentially different weather conditions, so that $C_{r1}=C_{r1}(s)$).

Since the cost function to J(F) to be minimized and the constraint relating to maximum travel time $T_{max}$ to be met reflect both objectives in the space domain, the status equation (2) can be rewritten in the space domain (see equation (9) below) and the state variable $v$ (i.e. the speed), is replaced by the kinetic energy K so that the equations (2)-(5), using the definitions of exogenous forces acting on the vehicle V, given by equations (6)-(8) can be rewritten as follows:

$$\frac{dK}{ds} = F - m\ g\ \sin(\alpha) - \frac{\rho_{air}\ C_x\ A}{m}K - m\ g\ \cos(\alpha)\left[C_{r0} - C_{r1}\frac{2\ K}{m}\right] \quad (9)$$

$$\frac{1}{2}m\ v_{min}^2 = K_{min} \le K \le K_{max} = \frac{1}{2}m\ v_{max}^2 \quad (10)$$

$$F \le F_{max} \quad (11)$$

$$\int_0^S \sqrt{\frac{m}{2\ K}}\ ds \le T_{max} = \frac{S}{\bar{v}_{des}} \quad (12)$$

where $K_{min}$ is the kinetic energy associated with the minimum speed $v_{min}$ and $K_{max}$ is the kinetic energy associated with the maximum speed $v_{max}$.

The integral constraint (12), to be suitably treated, requires the introduction of the additional state variable t(s), i.e. the time required to travel the space s, thus resulting in the addition of a further constraint equation:

$$\frac{dt}{ds} = \sqrt{\frac{m}{2\ K}} \quad (13)$$

according to which, the integral constraint (12) can be explicitly rewritten as:

$$t(S)=T_{max} \quad (14)$$

This stated, based on the method according to the present invention, the minimization of the cost function J(F), while respecting the constraints described above can be obtained according to the method of the present invention, by means of the minimization of the integral of the Lagrangian, function of the driving force F, given by:

$$\mathcal{L}(F) = \quad (15)$$

$$\int_0^S \left\{F^2 + a(s)\left[\frac{dK}{ds} - F + m\ g\ \sin(\alpha) + \frac{\rho_{air}\ C_x\ A}{m}K + m\ g\ \cos(\alpha)\right.\right.$$

$$\left.\left(C_{r0} - C_{r1}\frac{2\ K}{m}\right)\right] + g_1(K) +$$

$$g_2(K) + g_3(F, v(K)) + \lambda\left(\frac{dt}{ds} - \sqrt{\frac{2\ K}{m}}\right)\right\}ds +$$

$$b_1(K(0) - K_0) + b_2(t(0) - 0) + \varphi(t(S) - T_{max})^2$$

where the penalisation functions $g_1$, $g_2$ and $g_3$ are defined by the following equations:

$$g_1(K) = \begin{cases} c_1(K - K_{max})^2 & \text{if } K > K_{max} \\ 0 & \text{if } K \le K_{max} \end{cases} \quad (16)$$

$$g_2(K) = \begin{cases} c_2(K_{min} - K)^2 & \text{if } K < K_{min} \\ 0 & \text{if } K \ge K_{min} \end{cases} \quad (17)$$

$$g_3(F, v) = \begin{cases} c_3(F - F_{max}(v))^2 & \text{if } F > F_{max} \\ 0 & \text{if } F \le F_{max} \end{cases} \quad (18)$$

where $c_1$, $c_2$ and $c_3$ are penalisation coefficients.

Figure 4:
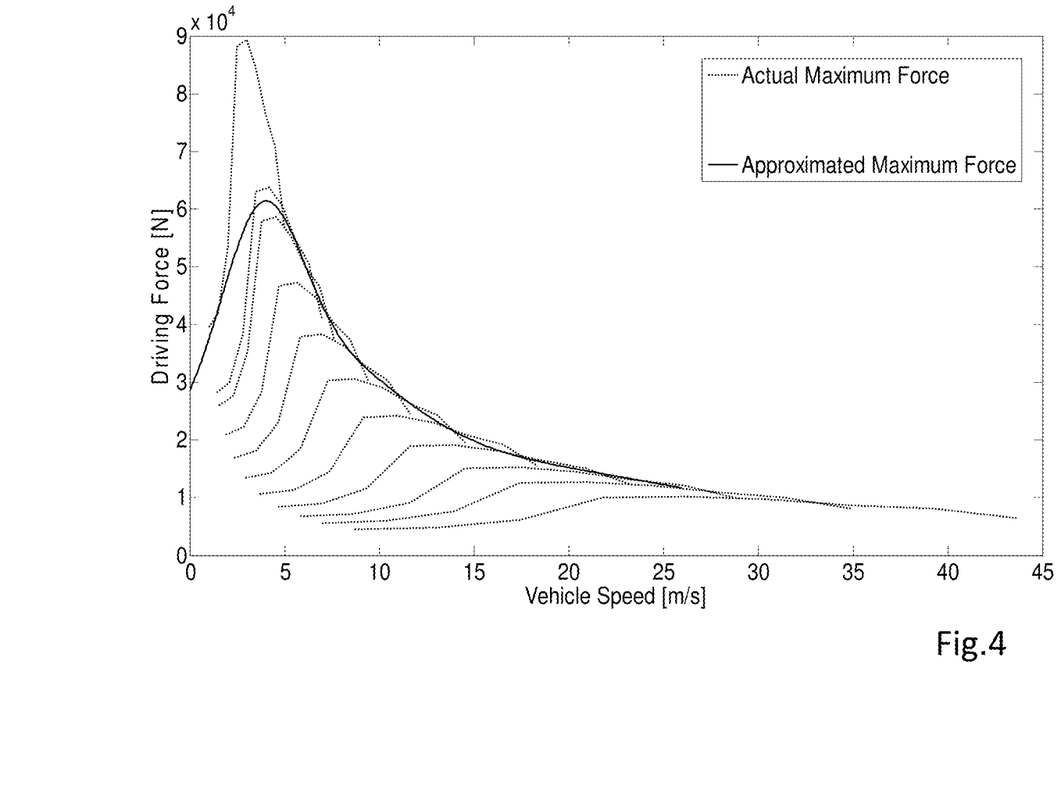
FIG. 4 is a representation of an approximation of the driving force of a vehicle, according to the method of the present invention.

In the equations above, the available maximum driving force $F_{max}$, according to the method of the present invention, can be obtained for example by means of an analytical approximation function of the envelope of the maximum driving force for each gear, as shown in FIG. 4, given by the sum of three Gaussian functions according to the relation:

$$F_{max}(v) = \sum_{j=1}^{3} \zeta_j e^{-\left(\frac{v-\eta_j}{\xi_j}\right)^2} \quad (19)$$

wherein $v$ is the vehicle speed and $\zeta_{1\ldots3}$, $\eta_{1\ldots3}$, $\xi_{1\ldots3}$ are nine constant coefficients.

It must be considered that the Gaussian functions necessary to the representation of the envelope of the maximum driving force for each gear (i.e. as a function of speed $v$) could be any other number P greater than or equal to 2 (e.g. 2, 4 or 5), and the number of the constant coefficients $\zeta_{1\ldots P}$, $\eta_{1\ldots P}$, $\xi_{1\ldots P}$, is equal to 3 times P. Moreover, it must be kept in mind that the available maximum driving force $F_{max}$ could be represented in analytical form with other basic functions rather than with Gaussian functions, for example by using a piecewise linear function.

In the integral of the Lagrangian (15), the presence of the constraints of equality (9) and (13), according to the method of the invention requires the introduction of added fields $\alpha(s)$ and $\lambda$; in addition, in the integral of the Lagrangian (15) $\varphi$ is the amplitude of a quadratic penalisation term, to meet the constraint (14), while $b_1$ and $b_2$ are Lagrange multipliers, which however do not have any operational significance.

Figure 5:
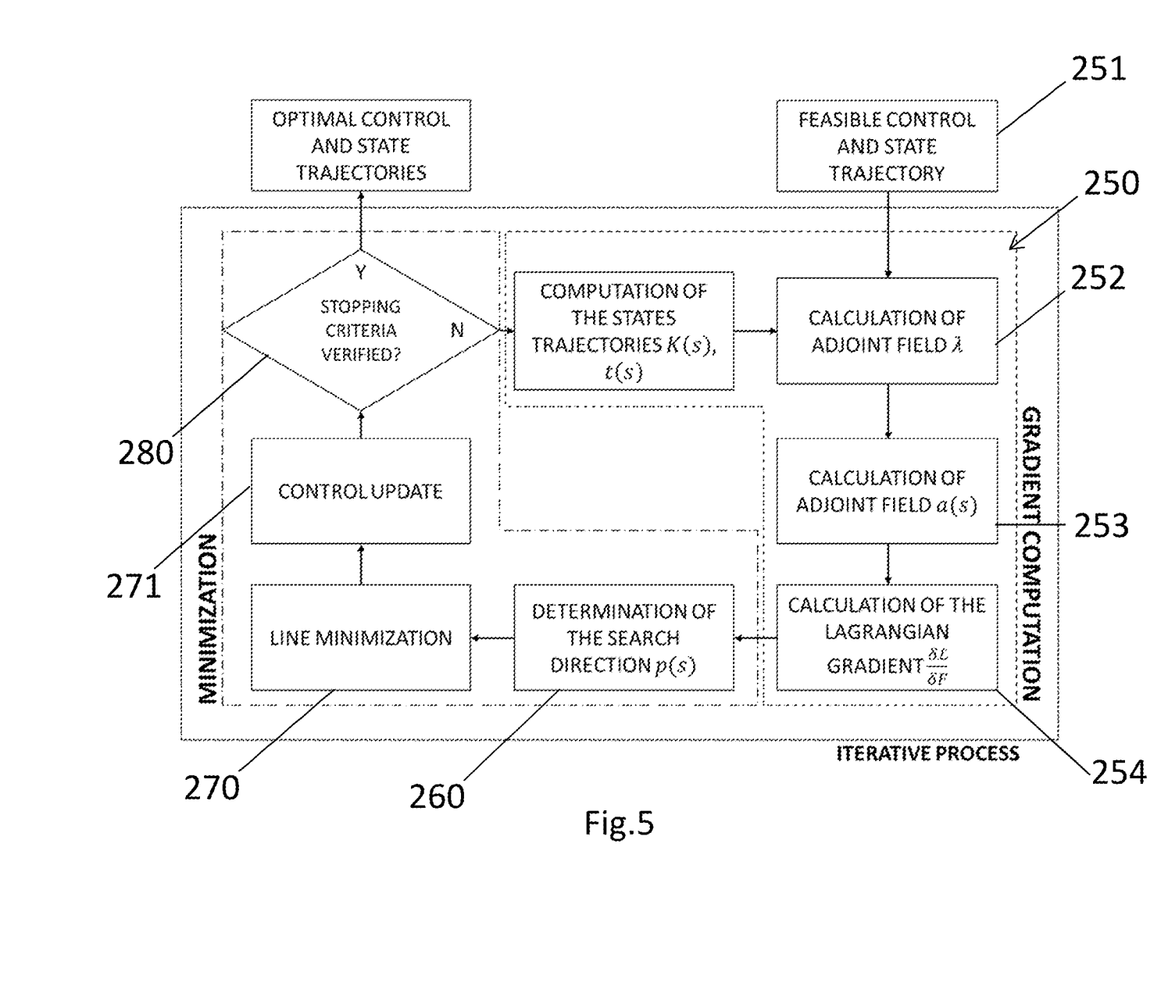
FIG. 5 shows an example block diagram of an iterative optimization procedure, carried out during the first optimisation process of the method according to the invention.

The method according to the invention performs an algorithm of computation of the Lagrangian gradient (15). In the preferred embodiment of the method according to the invention, that algorithm is adjoint-based iterative and, as shown in FIG. 5, follows the method of the conjugate gradient. That algorithm provides for the computation of the gradient of the integral of the Lagrangian (15)

$$\frac{\delta \mathcal{L}}{\delta F}$$

(step 250) using the added field, and the minimization of the integral of the Lagrangian is in fact performed by the method of the conjugate gradient by iteratively using the gradient $$\frac{\delta \mathcal{L}}{\delta F}$$

thus calculated, to determine the search direction along which to search for the minimum (step 260). In particular, the penalisation coefficients $c_1$, $c_2$ and $c_3$ of equations (16)-(18) can be constant or optionally progressively increased at successive iterations; similarly, the amplitude $\varphi$ of the quadratic penalisation term can be a constant value or optionally modifiable, dynamically, at successive iterations. Once the search direction is determined, the algorithm provides to perform the line minimization (step 270) and repeat the iterations until at least one stop criterion of the same iterations is met (step 280), which indicates that a minimum of the Lagrangian integral has been reached.

Since this is an iterative method, it provides to give likely initial values K(s) and t(s) for the variable F(s), for example by solving equations (9) and (13) (step 251).

For the gradient computation, the added field is then determined λ (step 252), by solving the following added equation:

$$\frac{\delta \mathcal{L}}{\delta t} = 0 \rightarrow \begin{cases} \frac{d\lambda}{ds} = 0 \\ \lambda(S) = 2\varphi(t(S) - T_{max}) \end{cases} \qquad (20)$$

derived from the first disturbance of the Lagrangian integral (15).

The solution of the above differential equation is trivial and highlights that λ must be constant and equal to its final condition.

At the next step (step 253), the field a(s) is determined, by solving the following the second added equation:

$$\frac{\delta \mathcal{L}}{\delta K} = 0 \rightarrow \begin{cases} \frac{da}{ds} = -2a\left(\frac{1}{2}\frac{\rho_{air} \, C_x \, A}{m} + C_{r1} \, g \, \cos(\alpha)\right) + \frac{dg_1}{dK} + \frac{dg_2}{dK} + \frac{1}{2}\lambda\sqrt{\frac{m}{2}}\frac{\sqrt{1}}{K^3} \\ a(S) = 0 \end{cases} \qquad (21)$$

from which (step 254) the gradient of the Lagrangian integral is obtained based on the relation:

$$\frac{\delta \mathcal{L}}{\delta F} = -a + 2F + \frac{dg_3}{dF} \qquad (22)$$

The gradient of the Lagrangian integral thereby calculated is used in step (step 260) for determining the search direction $p_k$, in the space of decision variables, wherein, at the k-th iteration, the search direction $p_k$ is determined based on the relation:

$$\begin{cases} p_k = -\frac{\delta \mathcal{L}}{\delta F}\Big|_k & \text{if } k = 1 \\ p_k = -\frac{\delta \mathcal{L}}{\delta F}\Big|_k + \beta_k p_{k-1} & \text{if } k > 1 \end{cases} \qquad (23)$$

wherein:
in the first iteration (k=1), as search direction the opposite of the gradient, i.e. the steepest descent direction is used, and
In subsequent iterations (k>1) the conjugate gradient is determined, where β represents the momentum of the search direction at the previous iteration and is determined by the formula of Polak-Ribiére:

$$\beta_k = \max\left(0; \frac{\left(-\frac{\delta \mathcal{L}}{\delta F}\Big|_k\right)^T \left(-\frac{\delta \mathcal{L}}{\delta F}\Big|_k + \frac{\delta \mathcal{L}}{\delta F}\Big|_{k-1}\right)}{\left(-\frac{\delta \mathcal{L}}{\delta F}\Big|_{k-1}\right)^T \left(-\frac{\delta \mathcal{L}}{\delta F}\Big|_{k-1}\right)}\right) \qquad (24)$$

IT is to be considered that β can be determined by other formulas, such as for example the Fletcher-Reeves or Hestenes-Stiefel formula.

Once the search direction has been determined, the line minimization is performed by calculating (step 270) the length of the pitch ($h_k$) of the driving force F that ensures the maximum reduction of the cost function $$F_{k+1} = F_k + h_k p_k \qquad (25)$$

by iteratively solving the following not linear equation, for the scalar h, $$\frac{\partial \mathcal{L}(F + h \, p)}{\partial h} = \qquad (26)$$

$$\frac{\partial \mathcal{L}(F + h \, p)}{\partial (F + hp)} \frac{\partial \mathcal{L}(F + h \, p)}{\partial h} = \left(2(F + hp) - a + \frac{dg_3}{dF}\right) = 0$$

for example, by the method of Brent described by R. P. Brent in "Chapter 4: An algorithm with Guaranteed Convergence for finding a zero of a Function", Algorithms for minimization without derivatives, Englewood Cliffs, N.J.: Prentice-Hall, 1973, ISBN 0-13-022335-2, or also by other methods such as Dekker algorithm.

Once the length $h_k$ of the pitch is determined, the control variable F, is updated (step 271) and at step 280 it is checked whether a criterion for stopping the iteration is met or not.

The stop criterion of the algorithm according to the preferred embodiment of the method of the present invention is given by:

$$\begin{cases} \frac{J(F_k) - J(F_{k-1})}{J(F_{k-1})} \le \varepsilon_J \\ \frac{t(S)|_k - t(S)|_{k-1}}{t(S)|_{k-1}} \le \varepsilon_t \end{cases} \qquad (27)$$

wherein $\varepsilon_J$ and $\varepsilon_t$ are two predetermined threshold values.

As shown, the stop criterion is given by two conditions: a first condition, linked to the cost function J(F), which is considered to be minimized when the relative variation of the same between an iteration and the previous one is less than or equal to $\varepsilon_J$; the second stop criterion, which also must be met in order for the iterations to stop, concerns the duration t(S) of the whole route, whose variation between an iteration and the previous one cannot be greater than $\varepsilon_t$.

Based on the calculations mentioned above, the first optimization process (step 200 of FIGS. 1 and 5) provides as output a reference signal of the speed v(s) of vehicle V and a reference signal of the driving force F(s), as a function of its position s along the route to travel.

Based on the results outputted from the first optimisation process, the method according to the present invention provides for performing a second optimisation process (step 300 of FIG. 1) of a second cost function, which is different from the cost function of the first optimisation process, by the method of the dynamic programming (also known as dynamic programming or dynamic optimization), which is a cost function $J_2$ of fuel consumption. The cost function $J_2$ is expressed as the sum, on M length segments $\Delta s_2$ that make up the route of length S, of the costs due to the fuel consumption along each segment i-th having length $\Delta s_2$ and penalisation factors, aimed at penalising the gear changes, wherein an additional penalisation is applied when a gear change occurs on uphill sections of the route.

Figure 6:
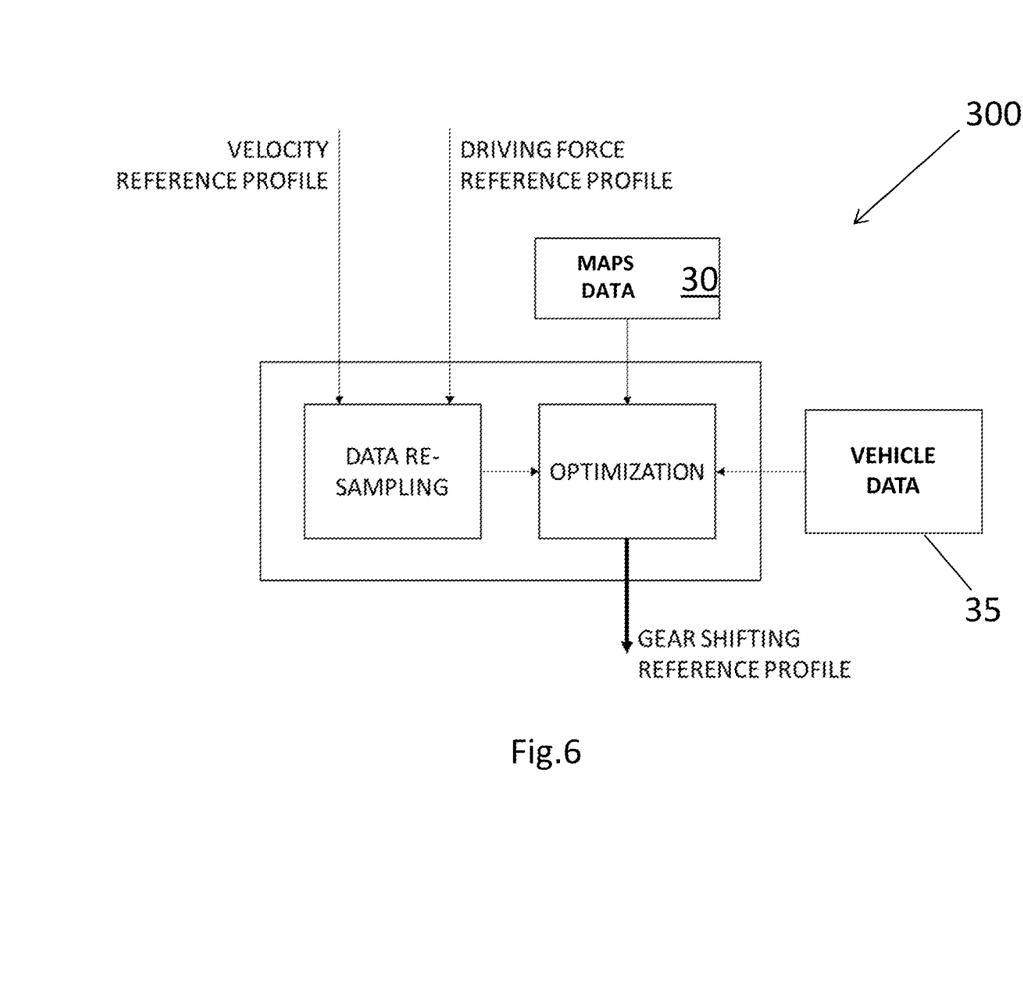
FIG. 6 shows an example block diagram of second optimisation process of the method of FIG. 1.

The block diagram of FIG. 6 schematically illustrates the second optimisation process of the preferred embodiment of the method according to the present invention. In particular, the second optimisation process, based on the reference signal of the speed v(s) of the vehicle and a reference signal of the driving force F(s) obtained from the first optimization process (step 200 of FIGS. 1 and 5) of the method and the data mentioned above relating to the type of the route to travel, in particular with reference to the slope or altitude of the roadway to travel and the vehicle V (mass, fuel flow maps, transmission ratios or the like).

More in detail, this second optimisation process performs the minimization of the cost function $J_2$ as a function of the gear changes γ, associated with the fuel consumption of the vehicle, and given by the relation:

$$\min_{\gamma_i \in \Gamma_i} \{J_2\} = \min_{\gamma_i \in \Gamma_i} \left\{ \sum_{i=1}^{M} \left( \frac{W_{f,i}(\gamma_i)\Delta s_2}{v_i} + \mu_{1,i}(\alpha_i, m)|u_{sh,i}| + \mu_2|u_{sh,i}| \right) \right\} \quad (28)$$

with the following state equation:

$$\gamma_{i+1} = \gamma_i + u_{sh,i} \quad (29)$$

and the constraints that follow:

$$\gamma_i \in \Gamma_i \quad (30)$$

$$\Gamma_i: n_{e,min} \le n_e(\gamma_i, K_i) \le n_{e,max} \quad (31)$$

$$u_{sh,i} \in [-2;-1,0;+1;+2] \quad (32)$$

wherein:

$$M = \frac{S}{\Delta s_2} \quad (33)$$

$$\mu_{1,i} = \begin{cases} m \cdot \alpha_i & \text{if } \alpha_i > 0 \\ 0 & \text{if } \alpha_i \le 0 \end{cases} \quad (34)$$

and wherein:
 $u_{sh,i}$ is the gear change signal in segment i and represents the control variable;
 M is the number of addenda of the cost function $J_2$ (equal to the number of length segments $\Delta s_2$ that compose the route of length S);
 $W_{f,i}$ is the fuel flow rate (mass/time) in segment i;
 $\Delta s_2$ is the constant length of each one of the M segments (even if in other embodiments of the method according to the invention the length $\Delta s_{2,i}$ of each segment i can be in general different from the lengths of the other segments);
 $\mu_{1,i}$ is a first penalisation coefficient that is variable as a function of the mass m of the vehicle and the slope $\alpha_i$ of the segment i;
 $\mu_2$ is a second penalisation coefficient which is constant;
 $\gamma_i$ is the gear of the vehicle in the segment i, comprised between the set of gears $\Gamma_i$, and represents the state variable (in general, the set of gears $\Gamma_i$ can change section by section),
 $n_e$ is the speed of the engine, between a maximum value and a minimum value $n_{e,max}$ and $n_{e,min}$.

It must be considered that, similarly to the prior art systems, when exceptional or emergency conditions occur that require the engagement of gears outside the set $\Gamma_i$ or the operation of the brakes, both in automatic mode and for direct intervention of the driver, the method according to the invention stops its execution (i.e. is turned off).

A sufficiently high value must be assigned to penalisation factors $\mu_{1,i}$ and $\mu_2$ so that the gear changes that are not needed are properly penalised.

Moreover, it should be noted that equation (32) limits the set of possible operations between: maintain the gear (0), increase one or two gears (+1, +2) or decrease one or two gears (−1, −2).

The term $W_{f,i}$ the first contribution of the addenda of the sum of the cost function $J_2$, can be expressed as a function of the torque $T_e$ developed by the engine and the speed $n_e$ of the same engine, according to the fuel flow map $W_f(T_e, n_e)$ of the engine of the vehicle. As it can be easily understood, other engine parameters can be alternatively or additionally used to determine the fuel flow rate $W_{f,i}$, in a totally obvious way for the person skilled in the art.

According to the present invention, however, the speed $n_e$ and the torque $T_e$ developed by the engine can be expressed as a function of the gear γ through the relations:

$$T_e(F, \gamma) = \frac{F \, R_w}{i(\gamma)} \quad (35)$$

$$n_e(v, \gamma) = \frac{v \, i(\gamma)}{R_w} \quad (36)$$

where i(γ) is the global transmission ratio, with the engaged gear γ, and $R_w$ is the radius of the wheel of the vehicle V.

From equations (35) and (36) it is therefore clear that, once known F(s) and v(s), supplied in output from the first optimisation process of the method according to the present invention, the cost function $J_2$, different from the cost function of the first optimisation process, associated with the fuel consumption during the route, is a function of only the engaged gear $\gamma_i$ in each segment of the route to travel.

Therefore, in output from the second optimization process of the method according to the present invention, there is obtained a reference signal of the engaged gear γ(s) (or the gear changes $u_{sh}(s)$) of the vehicle V, along the route to travel; advantageously, although the signal of the engaged gear $\gamma_i$ refers to the segment i, nevertheless the reference signal of the engaged gear γ(s) (or the gear changes $u_{sh}(s)$) is provided as a control signal at a certain travelled distance s.

Having said that, in view of the above, it is clear how the method according to the present invention, that implements two successive processes of optimization, each one based on a cost function that is different from that of the other optimization process, is able to obtain reference signals of the speed v(s) of a vehicle V and the gear engaged γ(s) (or the gear changes $u_{sh}(s)$) along the entire route travel so that, given the current position s of the vehicle V along the way, it will be possible to determine in a completely unique way the corresponding values of the speed v(s) and of the reference gear γ(s).

A system for obtaining reference signals for control systems of a vehicle V, as function of the geographic position of the same vehicle along a route travel will be now described purely by way of example and with reference to FIG. 2.

Such a system 2 comprises at least one device 3 for collecting data, configured to output data relating vehicle V and a route to travel, as well as any data that can be inserted by the driver of the vehicle V and data related to the engine of the vehicle V. In FIG. 2, said at least one device 3 comprises: a memory 3a that stores data related to the vehicle V, such as the total mass m of the vehicle V (the value of which can possibly be updated by weight sensors positioned on the specific components of the vehicle V), an aerodynamic resistance coefficient $C_x$, frontal area A of the vehicle V, the first and the second coefficient $C_{r0}$ and $C_{r1}$ rolling resistance of the tires of the vehicle V (which can be updated based on the progressive wear of the tires); a satellite navigator 3b (provided for example with GPS sensor and/or GLONASS) that provides data relating to the position of the vehicle and the route to travel, such as the current position of the vehicle, a geographical destination position, information relating to the route between the position of the vehicle V and the destination (such as the slope or the altitude of the roadway that the vehicle V must travel), data corresponding to the speed limits along the way, and optionally information relating to traffic conditions and the weather condition; an input/output interface 3c through which the driver of the vehicle can enter user data, such as for example a desired arrival time, an average speed, the maximum and minimum speed required by the driver, and optionally a degree of adherence to the speed set by the driver; a 3d system configured to provide in output data relating to the engine, optionally comprising one or more sensors 3d configured to provide in output data related to the torque developed by the engine and/or the speed of the engine itself (such sensors may be those already present in the vehicle and the data can be retrieved from the communication board system, such as the CAN-BUS) and a memory which stores the pattern of the maximum torque developed by the engine of the vehicle, fuel flow maps (for example as function of the torque developed by the engine and the engine speed) and the transmission ratios. Other embodiments of the system according to the invention can comprise additional sensors, for example for detecting a ambient air density and/or weather conditions.

The system 2 also comprises at least one first module 4 for optimizing the driving force, operatively connected to said at least one device 3, and configured to determine, by means of a first optimisation process such as that described above with reference to FIG. 5, a driving force signal F(s) and a speed signal v(s) to the vehicle, based on the position s of the vehicle V, along the route.

The system 2 further comprises at least one second module 5 for optimizing the fuel consumption, arranged downstream of the first module 4 for optimizing the driving force and operatively connected to said first module 4 and to said at least one device 3 for collecting data. The second optimization module 5 is configured to determine a reference signal of the reference gear γ(s) (or the gear changes $u_{sh}(s)$) of the vehicle V, along the route to be travelled, through a second optimisation process.

In particular, the first and the second module 4 and 5 can be implemented through two respective processing units, provided for example with at least one microprocessor or micro-controller, or through a single processing unit, provided for example with at least one microprocessor or micro-controller, configured to perform the method according to the invention.

Said at least one device 3 is configured to provide the first module 4 and the second module 5 with the data illustrated above with reference to the optimization processes of FIGS. 3, 5 and 6.

The first and the second module 4 and 5 receive from the satellite navigator 3b the information regarding to the route to travel i.e. the slope or the altitude of the roadway along the route to travel, which route is set by the driver by means of the interface input/output 3c, and speed limits provided along that route (and optionally the information regarding the traffic conditions and the weather condition) based on which the first and the second module 4 and 5 perform the first and the second optimization process, respectively, as shown in FIGS. 3 and 6 (wherein such information are cumulatively indicated with the reference number 30).

The information 30 provided by the satellite navigator 3b may also have been stored beforehand in the same satellite navigator, or may be processed on case by case basis, optionally through a connection by means of a wireless radio communication network (wireless) according to one communication protocol suitable for one or more remote servers or to a remote processing unit.

FIGS. 3 and 6 also show the information 35 supplied by the memory 3a and by the system 3d to the first and the second module 4 and 5 (even if the information 35 provided by the system 3d is actually used only by the second module 5), i.e. the information comprising data relating to the mass, the aerodynamic resistance, the rolling friction, to pattern of the maximum torque developed by the engine of said vehicle, to the corresponding fuel flow maps, the fuel flow velocity (i.e. the flow rate of fuel) and the gear ratios.

Now, as it can easily be imagined one system like the one described above can be totally integrated into one vehicle or it can be only in part. Some versions are in fact foreseen, which hereinafter will be presented with reference to FIG. 7.

Figure 7:
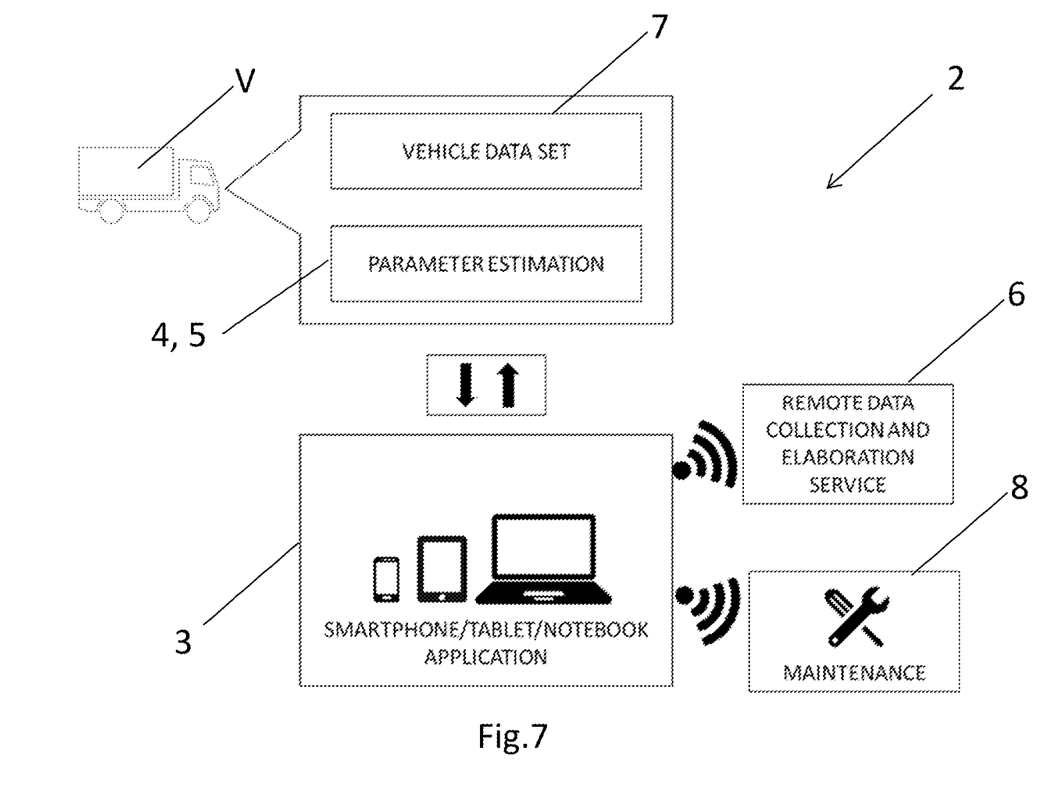
FIG. 7 is an exemplary representation of one between various versions of a system configured to implement the method according to the present invention.

According to three main versions, the optimization modules 4 and 5 can be installed on board of the vehicle V or may be external to the vehicle V, for example installed, by means of a suitable software application on a computer device 6 in the cloud, with which they communicate through a suitable communication protocol and/or can be installed on an external device 3, for example a smartphone, tablet, personal computer, operatively connected by means of suitable communication interfaces and in a manner known to a person skilled in the art, to the other components of the system.

At least one of the above versions provides that the data of the vehicle V concerning in particular the engine are stored on board the vehicle itself, for example on an adjusted memory 7 of the non-volatile type. Such data, as said above, shall be measured or made available by the manufacturers of the vehicle V and/or the engine of the vehicle V as part of the specifications of the vehicle V and/or of the engine itself.

At least one of the above versions provides that at least the constant data of the vehicle V and/or the engine of the vehicle V (with constant a parameter that does not vary during the life of the vehicle V and/or the engine of the vehicle V is intended), are stored on board, for example by means of an adjusted non-volatile memory 7 suitable for the purpose. The parameters that the vehicle V and/or the engine of the vehicle V which vary during the life of the vehicle V and/or the engine, may instead be estimated in-line through estimation techniques such as Kalman filters, state observers, state estimators and the like. Reference is made in this case, to:

parameters of the vehicle V, such as the aerodynamic resistance coefficient, the rolling friction coefficient, the masses, the inertia, the characteristics of the chassis or other; and engine parameters, such as the torque and/or power that can be developed, the fuel consumption maps and any other indication of the fuel quantity as a function of the operating conditions.

Alternatively, the method and the relative system according to the present invention can provide that the parameters of the vehicle V and/or engine, among those previously mentioned, which vary during the life cycle of the vehicle V and/or of the engine can be estimated not in-line and not on board the vehicle itself by an external system 8, for example during maintenance operations of the vehicle V and/or of the engine and then subsequently stored on board in an adjusted non-volatile memory, optionally on a external device 3, such as for example a smartphone, tablet or the like.

According to another version of the method and the corresponding system of the present invention, both the constant parameters and the ones that are not constant of the vehicle V and/or the engine may be stored on an external device 3 (for example a smartphone or tablet or the like), independently from the fact that they are constants or that they are estimated in-line.

In view of the above it can be clearly understood that a system like the one described above can be integrated in a control system of a vehicle (which is also an object of the present invention), including, inter alia, one or more control apparatuses configured to control the speed (v) and the gear engaged ($\gamma$) (or the gear change ($u_{sh}$) for the vehicle V, operatively connected downstream of the system 2, from which they receive, in use, the reference signals determined according to the method described above.

Said one or more apparatuses for controlling the speed v and the gear engaged $\gamma$ (or of the gear changed $u_{sh}$) of the vehicle V, include, for example, a cruise control system which regulates a power-train, or a control unit of the gearbox or any other control device that contributes directly or indirectly to the control of the fuel consumption, the reduction of emissions, the safety while driving and similar.

The method and the system for obtaining reference signals described above fulfil the objects indicated above.

With particular reference to the method, experimental studies have shown that, under equal conditions with respect to traditional methods, the method according to the present invention provides for reference signals for vehicles control systems that allow to adjust the speed v of a vehicle V, improving performance from the consumption point of view and reducing, at the same time, the travel times. In addition, the two optimization processes performed in sequence, and not at the same time, by the method according to the present invention, allows to considerably reduce the computational complexity of the method, thereby making it also more efficient from the computational point of view.

Figure 8:
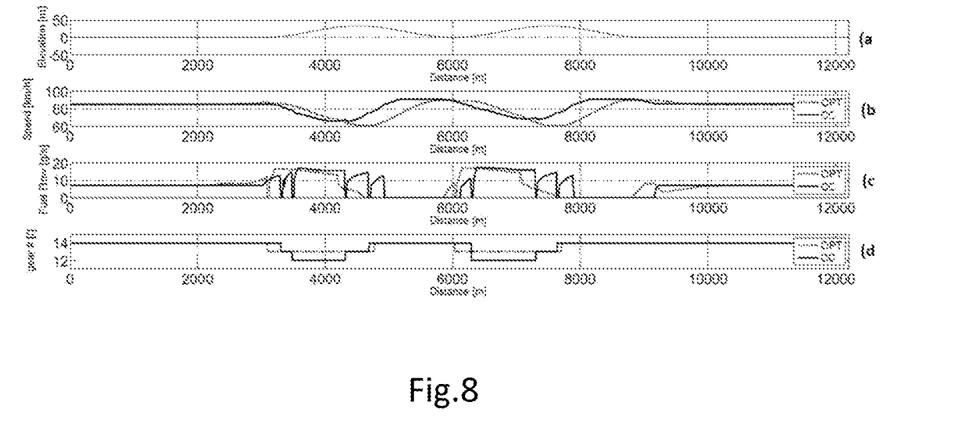
FIG. 8, shows the trend of the speed profiles (b), fuel consumption (c) and gear switching (d), respectively, obtainable along a route shown in (a) with a traditional method (CC) for adjusting the speed of a vehicle and with the method of FIG. 1 (OPT)

Below the results are shown of some tests carried out and illustrated in FIG. 8. FIG. 8 shows a comparison between the behaviour of the proposed method (OPT) as compared to the traditional method (CC), in the case of a vehicle with a full load, running the route whose profile in terms of altitude is reported in graph (a).

The traditional method implemented by a fixed point cruise control system (continuous line), acts on the gas control, on the basis of the residual between a reference speed (constant) and an actual speed. The gear changes are activated by the prediction of the current load, considering the maximum efficiency range of the engine in terms of revolutions per minute (rpm). Such a logic may generate, in some circumstances, an excessive series gear changes, leading to some disadvantages such as the loss of momentum, during the time interval in which the clutch disengages the engine from the wheels, with a consequent increase in fuel consumption on uphill sections of the route, and increased stresses on the transmission.

The method according to the present invention, on the other hand, (see the dashed lines in (b), (c) and (d) of FIG. 8), dynamically changes the reference speed and the engagement of the gears, based on the topography of the route, adapting to the profiles of the slope and, therefore, saving fuel.

By way of example, with reference to FIG. 8(*b*), it should be noted that the speed is slightly increased at approximately 3000 m, at the beginning of an uphill section, and at the same time the gear is predictively downshifted (Errore. L'origine riferimento non è stata trovata. (d)). The increased momentum is beneficial to tackle the next section at the higher speed, where the slope of the roadway increases rapidly. Furthermore, the gear change in advance allows to avoid to further change gear during the ascent. At the end of the uphill section, the traditional method provides for the quick return to the reference speed, while the method according to the present invention leaves the vehicle slowing down gently to exploit the next section of descent (4500-6000 m) for regaining speed.

At the end of the slope, the method according to the present invention maintains a higher speed compared to the traditional method, to compensate for the time lost in the preceding section.

Since this section is approximately plane, the method according to the present invention provides for a slight increase with reference to consumed fuel, which however is compensated by a gain in terms of journey time.

Figure 9:
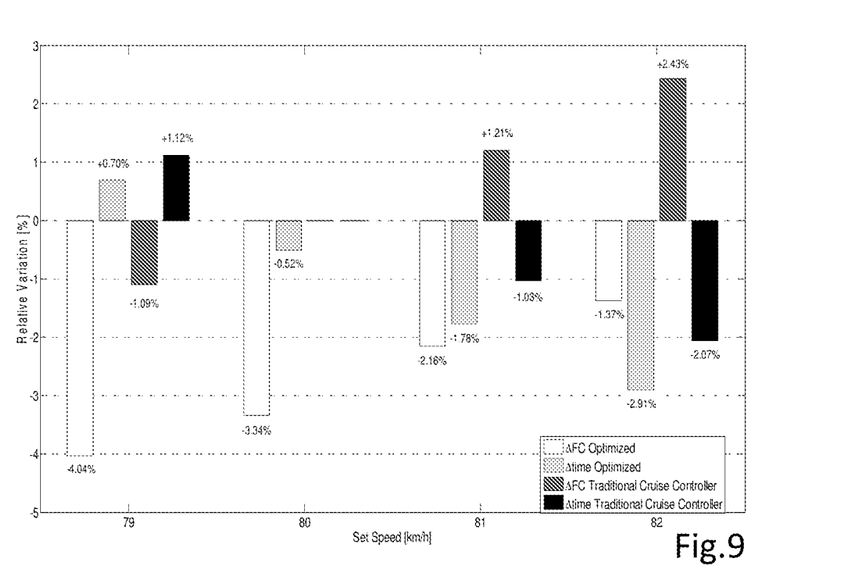
FIG. 9 shows some experimental results supporting the efficacy of the present invention.

In this regard, in FIG. 9 the fuel consumption ($\Delta FC$) is reported together with the variations of travel times ($\Delta time$), in the case of a vehicle of 44*t* at full load with different reference speeds, both for the traditional method (with reference speed constant—whose graphs are indicated with "Traditional Cruise Controller" in FIG. 9), both for the method according to the present invention (whose graphs are indicated with "Optimized" in FIG. 9).

The variations shown in the graph are related to the fuel consumption and the travel times obtained with a traditional method at reference speed set equal to 80 km/h on a stretch of road actually existing over more than 100 km.

As it can be noted, the method of the present invention allows, at equal reference speed, to save fuel and time.

Moreover, it is also possible to increase the reference speed to 82 km/h to save nearly 3% in terms of journey time, while maintaining a saving of fuel consumed of 1.37%. On the contrary, the increase of the reference speed to 82 km/h entails an increase in fuel consumption of 2.43% for the traditional method known as cruise control at a fixed point to, although it has a reduction in journey time of about 2%.

On the other hand, the reduction of the reference speed to 79 km/h allows for the method according to the present invention to save over the 4.04% of fuel, increasing the duration only of 0.70%.

In the foregoing the preferred embodiments were described and some modifications of this invention have been suggested, but it should be understood that those skilled in the art can make modifications and changes without departing from the relative scope of protection, as defined by the appended claims.

The invention claimed is:

1. Method for obtaining reference signals for systems for controlling a vehicle in combination with a method for controlling the vehicle, in function of a geographical position of said vehicle along a route to travel, comprising the operating steps of:

providing vehicle data relating to said vehicle and storing the vehicle data in a memory;

providing travel data relating to a route to travel via a satellite navigator;

determining, on the basis of said vehicle data and said travel data, at least one reference signal of a driving force F of said vehicle and at least one reference signal of a speed v for said vehicle, in function of the position s of said vehicle along said route to travel, through a first optimisation process via at least one microprocessor configured to optimise the driving force F along said route to travel;

determining at least one reference signal of an engaged gear $\gamma$ and/or of gear change $u_{sh}$ of said vehicle, in function of the position s of said vehicle along said route to travel, through a second optimisation process via the at least one microprocessor configured to optimise a fuel consumption of said vehicle along said route to travel;

said second optimisation process being subsequent to said first optimisation process and receiving as input said vehicle data, said travel data, as well as said at least one reference signal of the driving force F and said at least one reference signal of the speed v, determined through said first optimisation process; and controlling, via a vehicle control system, the speed and the engaged gear of the vehicle based on the first and second optimisation processes to improve at least one of fuel consumption, emissions, travel time and safety.

2. Method according to claim 1, wherein said vehicle data comprise information related to a mass, an aerodynamic resistance, a rolling friction, a curve of a torque developed by an engine, one or more fuel flow maps and transmission ratios of said engine, wherein optionally said vehicle data are constant or variable during the life of said vehicle and/or of said engine of said vehicle and wherein said variable data can be more optionally estimated in-line or not in-line.

3. Method according to claim 1, wherein said travel data comprise: an itinerary of said route to travel including a starting geographical position and a destination geographical position, a current geographical position, a slope and/or an elevation along said route to travel, and optionally one or more data selected from the group comprising data relating to speed limits established along said route to travel, an estimated arrival time or a desired maximum travel time, at least one desired average speed, at least one desired maximum speed and at least one desired minimum speed, at least one degree of adherence to said desired average speed, to said at least one desired maximum speed and to said at least one desired minimum speed, data relating to traffic conditions along said route to travel and data relating to weather conditions along said route to travel.

4. Method according to claim 1, wherein said first optimisation process is an analytical process of minimisation of a cost function J(F) of the driving force F required to drive said vehicle having mass m along said route to travel.

5. Method according to claim 4, wherein said minimisation of the cost function J(F) of the driving force F is given by the relationship:

$$\min_F \{J(F)\} = \min_F \left\{ \int_0^S F^2 ds \right\} \quad (1)$$

with the following state equation:

$$m\frac{dv}{dt} = F - F_{grade} - F_{drag} - F_{roll} \quad (2)$$

and the following constraints:

$$v_{min} \leq v \leq v_{max} \quad (3)$$

$$F \leq F_{max} \quad (4)$$

$$\int_0^S \frac{1}{v} ds \leq T_{max} = \frac{S}{\bar{v}_{des}} \quad (5)$$

where v is the speed of said vehicle, s is the length travelled by said vehicle along said route of overall length S, $v_{min}$ is the desired minimum speed and $v_{max}$ is the desired maximum speed, $F_{max}$ is the maximum available driving force of said vehicle, $T_{max}$ is a maximum travel time and $\bar{v}^{des}$ is the desired average speed, and taking account of exogenous forces as follows:

$$F_{grade} = mg \sin(\alpha) \quad (6)$$

$$F_{drag} = \frac{1}{2}\rho_{air}C_x A v^2 \quad (7)$$

$$F_{roll} = mg \cos(\alpha)[C_{r0} + C_{r1}v^2] \quad (8)$$

where m is the mass of said vehicle, g is the gravitational acceleration, $\alpha$ is an angle corresponding to the slope along said route to travel, $\rho_{air}$ is an ambient air density along said route to travel, $C_x$ is an aerodynamic resistance coefficient, A is a front area of said vehicle, $C_{r0}$ is a first rolling resistance coefficient, and $C_{r1}$ is a second rolling resistance coefficient.

6. Method according to claim 5, wherein said analytical process of minimisation of the cost function J(F) of the driving force F performs a minimisation of the integral of the Lagrangian $\mathcal{L}(F)$, function of the driving force F, given by:

$$\mathcal{L}(F) = \quad (15)$$
$$\int_0^S \left\{ F^2 + a(s)\left[ \frac{dK}{ds} - F + m\ g\ \sin(\alpha) + \frac{\rho_{air}\ C_x\ A}{m}K + m\ g\ \cos(\alpha) \right. \right.$$
$$\left. \left( C_{r0} - C_{r1}\frac{2\ K}{m} \right) \right] + g_1(K) +$$
$$\left. g_2(K) + g_3(F, v(K)) + \lambda\left( \frac{dt}{ds} - \sqrt{\frac{2\ K}{m}} \right) \right\} ds +$$
$$b_1(K(0) - K_0) + b_2(t(0) - 0) + \varphi(t(S) - T_{max})^2$$

where the functions $g_1$, $g_2$ and $g_3$ are defined by the following equations:

$$g_1(K) = \begin{cases} c_1(K - K_{max})^2 & \text{if } K > K_{max} \\ 0 & \text{if } K \leq K_{max} \end{cases} \quad (16)$$

$$g_2(K) = \begin{cases} c_2(K_{min} - K)^2 & \text{if } K < K_{min} \\ 0 & \text{if } K \geq K_{min} \end{cases} \quad (17)$$

$$g_3(F, v) = \begin{cases} c_3(F - F_{max}(v))^2 & \text{if } F > F_{max} \\ 0 & \text{if } F \leq F_{max} \end{cases} \quad (18)$$

where:

K is a kinetic energy associated to the driving force F, $K_{min}$ is a kinetic energy associated to the desired minimum speed $v_{min}$, $K_{max}$ is a kinetic energy associated to the desired maximum speed $v_{max}$,
$c_1, c_2, c_3$ are penalisation coefficients,
$t(s)$ is the travel time of said vehicle,
$\varphi$ is an amplitude of a quadratic penalty term,
$\alpha(s)$ is the adjoint field,
wherein the following constraints have to be satisfied $$\frac{dK}{ds} = F - mg\sin(\alpha) - \frac{\rho_{air}C_xA}{m}K - mg\cos(\alpha)\left[C_{r0} - C_{r1}\frac{2K}{m}\right] \quad (9)$$

$$\frac{1}{2}mv_{min}^2 = K_{min} \leq K \leq K_{max} = \frac{1}{2}mv_{max}^2 \quad (10)$$

$$F \leq F_{max} \quad (11)$$

$$\frac{dt}{ds} = \sqrt{\frac{m}{2K}} \quad (13)$$

$$t(S) = T_{max} \quad (14)$$

wherein said minimisation of the integral of the Lagrangian is executed by an algorithm of computation of the gradient of the integral of the Lagrangian $$\frac{\delta \mathcal{L}}{\delta F},$$

wherein said maximum available driving force $F_{max}$ is optionally expressible as an analytical function approximating an envelope of the maximum driving force for each gear.

7. Method according to claim 6, wherein said algorithm of computation of the gradient of the integral of the Lagrangian $$\frac{\delta \mathcal{L}}{\delta F}$$

is an adjoint-based iterative algorithm comprising the following steps:
computing a gradient $$\frac{\delta \mathcal{L}}{\delta F}$$

of the integral of the Lagrangian $\mathcal{L}(F)$;
iteratively using said gradient $$\frac{\delta \mathcal{L}}{\delta F}$$

of the integral of the Lagrangian $\mathcal{L}(F)$ to determine a search direction $p_k$ along which searching a minimum of said gradient $$\frac{\delta \mathcal{L}}{\delta F}$$

of the integral of the Lagrangian $\mathcal{L}(F)$;
executing a line minimisation; and
repeating said iterations until at least one criterion to stop said iterations, indicating that a minimum of the integral of the Lagrangian $\mathcal{L}(F)$ has been reached, is satisfied wherein the penalisation coefficients $c_1, c_2, c_3$ are optionally constant or optionally progressively increased in correspondence of successive iterations, and
wherein the amplitude $\varphi$ of the quadratic penalty term is optionally constant or optionally dynamically modifiable in correspondence of successive iterations.

8. Method according to claim 7, wherein said gradient $$\frac{\delta \mathcal{L}}{\delta F}$$

of the integral of the Lagrangian $\mathcal{L}(F)$ is given by:

$$\frac{\delta \mathcal{L}}{\delta F} = -a + 2F + \frac{dg_3}{dF} \quad (22)$$

wherein said search direction $p_k$ in correspondence of the k-th iteration of said adjoint-based iterative optimisation algorithm is given by:

$$\begin{cases} p_k = -\frac{\delta \mathcal{L}}{\delta F}\bigg|_k & \text{if } k = 1 \\ p_k = -\frac{\delta \mathcal{L}}{\delta F}\bigg|_k + \beta_k p_{k-1} & \text{if } k > 1 \end{cases} \quad (23)$$

where $\beta$ represents the momentum of the search direction in correspondence of the preceding iteration, that is optionally determined through the Polak-Ribiére formula:

$$\beta_k = \max\left(0; \frac{\left(-\frac{\delta \mathcal{L}}{\delta F}\big|_k\right)^T \left(-\frac{\delta \mathcal{L}}{\delta F}\big|_k + \frac{\delta \mathcal{L}}{\delta F}\big|_{k-1}\right)}{\left(-\frac{\delta \mathcal{L}}{\delta F}\big|_{k-1}\right)^T \left(-\frac{\delta \mathcal{L}}{\delta F}\big|_{k-1}\right)}\right) \quad (24)$$

wherein said line minimisation computes a step length $h_k$ of the driving force $F$ ensuring a maximum decrease of a cost function given by:

$$F_{k+1} = F_k + h_k p_k \quad (25)$$

iteratively solving a nonlinear equation for the scalar $h$ given by:

$$\frac{\partial \mathcal{L}(F+hp)}{\partial h} = \frac{\partial \mathcal{L}(F+hp)}{\partial (F+hp)}\frac{\partial \mathcal{L}(F+hp)}{\partial h} = \left(2(F+hp) - a + \frac{dg_3}{dF}\right) = 0 \quad (26)$$

9. Method according to claim 7, wherein said at least one criterion to stop said iterations is given by:

$$\begin{cases} \frac{J(F_k) - J(F_{k-1})}{J(F_{k-1})} \leq \varepsilon_J \\ \frac{t(S)|_k - t(S)|_{k-1}}{t(S)|_{k-1}} \leq \varepsilon_t \end{cases} \quad (27)$$

where $\varepsilon_J$ and $\varepsilon_t$ are two predetermined threshold values.

10. Method according to claim 1, wherein said second optimisation process is a dynamic process of minimisation of a cost function $J_2$ of the fuel consumption of said vehicle along said route to travel expressed as sum of M terms, where M is the number of segments having length $\Delta s_2$ forming said route to travel having length S, of the fuel consumption by said vehicle, along a i-th segment of length $\Delta s_2$ of said route of length S, and of penalising factors aimed at penalising gear changes on uphill and downhill sections.

11. Method according to claim 10, wherein said minimisation of the cost function $J_2$ of the fuel consumption is given by the following relationship:

$$\min_{\gamma_i \in \Gamma_i} \{J_2\} = \min_{\gamma_i \in \Gamma_i} \left\{ \sum_{i=1}^{M} \left( \frac{W_{f,i}(\gamma_i)\Delta s_2}{v_i} + \mu_{1,i}(\alpha_i, m)|u_{sh,i}| + \mu_2|u_{sh,i}| \right) \right\} \quad (28)$$

with the following state equation:

$$\gamma_{i+1} = \gamma_i + u_{sh,i} \quad (29)$$

and the following constraints:

$$\Delta_i \in \Gamma_i \quad (30)$$

$$\Gamma_i: n_{e,min} \leq n_e(\gamma_i, K_i) \leq n_{e,max} \quad (31)$$

$$u_{sh,i} \in [-2;-1;0;+1;+2] \quad (32)$$

where:

$$M = \frac{S}{\Delta s_2} \quad (33)$$

$$\mu_{1,i} = \begin{cases} m \cdot \alpha_i & \text{if } \alpha_i > 0 \\ 0 & \text{if } \alpha_i \leq 0 \end{cases} \quad (34)$$

and wherein:
$u_{sh,i}$ is a gear change signal in segment i;
M is a number of summing terms of the cost function $J_2$ of the fuel consumption;
$W_{f,i}$ is a fuel flow rate in segment i;
$\Delta s_2$ is a length of each one of the M segments;
$\mu_{1,i}$ is a first penalisation coefficient that is variable in function of the mass m of the vehicle and of the slope $\alpha_i$ in segment i;
$\mu_2$ is a second penalisation coefficient that is constant;
$\gamma_i$ is the gear of the vehicle in segment i, included in a set of gears $\Gamma_i$,
$n_e$ is the engine speed, ranging between a maximum value and a minimum value $n_{e,max}$ and $n_{e,min}$.

12. Method according to claim 11, wherein fuel flow rate $W_f$, function of the engine speed $n_e$ and of the torque $T_e$ developed by the engine, is expressed in function of said engaged gear $\gamma$ as follows:

$$T_e(F, \gamma) = \frac{FR_w}{i(\gamma)} \quad (35)$$

$$n_e(v, \gamma) = \frac{vi(\gamma)}{R_w} \quad (36)$$

where $i(\gamma)$ is a global transmission ratio, with the engaged gear $\gamma$, and $R_w$ is a wheel radius of said vehicle, and F and v are said at least one reference signal of the driving force and said at least one reference signal of a speed determined through said first optimisation process.

13. System configured for obtaining reference signals for systems for controlling a vehicle, in function of a geographical position of said vehicle along a route to travel, comprising:

at least one data collection device, configured to output at least data relating to said vehicle and at least data relating to said route to travel, and one or more processing units, configured to receive from said at least one data collection device said data relating to said vehicle and said data relating to said route to travel, said one or more processing units being configured to execute the method for obtaining reference signals and for systems for controlling the vehicle according to claim 1.

14. System configured for controlling the speed of a vehicle, comprising at least one system configured for obtaining reference signals according to claim 13 and one or more controlling apparatuses configured to control a speed of said vehicle and an engaged gear $\gamma$ of said vehicle along said route to travel on the basis of reference signals received from said at least one system configured for obtaining reference signals.

15. System according to claim 14, wherein said one or more controlling apparatuses comprise one or more apparatuses selected from the group comprising a cruise control system configured to control an engine unit, a unit controlling a gearbox of said vehicle and an apparatus configured to act on at least one braking device of said vehicle.

16. Set of one or more non-transitory computer readable media, having stored thereon one set of one or more computer executable instructions that, when executed by one or more processing units, cause said one or more processing units to perform a method for obtaining reference signals for systems for controlling a vehicle in combination with a method for controlling the vehicle, based on a geographical position of said vehicle along a route to travel, comprising the operating steps of:

providing at vehicle data relating to said vehicle and storing the vehicle data in a memory;

providing travel data relating to a route to travel via a satellite navigator;

determining, on the basis of said vehicle data and said travel data, at least one reference signal of a driving force F of said vehicle and at least one reference signal of a speed v for said vehicle, in function of the position s of said vehicle along said route to travel, through a first optimisation process via at least one microprocessor configured to optimise the driving force F along said route to travel;

determining at least one reference signal of an engaged gear $\gamma$ and/or of gear change $u_{sh}$ of said vehicle, in function of the position s of said vehicle along said route to travel, through a second optimisation process via the at least one microprocessor configured to optimise a fuel consumption of said vehicle along said route to travel;

said second optimisation process being subsequent to said first optimisation process and receiving as input said vehicle data, said travel data, as well as said at least one reference signal of the driving force F and said at least one reference signal of the speed v, determined through said first optimisation process; and controlling, via a vehicle control system, the speed and the engaged gear of the vehicle based on the first and second optimisation processes to improve at least one of fuel consumption, emissions, travel time and safety.

* * * * *